No. 735,061. PATENTED AUG. 4, 1903.
G. BRADY.
MACHINE FOR MOLDING CONCRETE BLOCKS.
APPLICATION FILED MAR. 13, 1903.
NO MODEL. 4 SHEETS—SHEET 4.

Witnesses
Georgiana Chace
Palmer A. Jones.

Inventor
George Brady
By
Luther V. Moulton
Attorney

No. 735,061. Patented August 4, 1903.

UNITED STATES PATENT OFFICE.

GEORGE BRADY, OF JACKSON, MICHIGAN.

MACHINE FOR MOLDING CONCRETE BLOCKS.

SPECIFICATION forming part of Letters Patent No. 735,061, dated August 4, 1903.

Application filed March 13, 1903. Serial No. 147,598. (No model.)

*To all whom it may concern:*

Be it known that I, GEORGE BRADY, a citizen of the United States, residing at Jackson, in the county of Jackson and State of Michigan, have invented certain new and useful Improvements in Machines for Molding Concrete Blocks; and I do hereby declare the following to be a full, clear, and exact description of the invention, such as will enable others skilled in the art to which it appertains to make and use the same.

My invention relates to improvements in machines for molding concrete blocks, and more particularly to a machine for molding blocks adapted for building purposes; and its object is to provide a manually-operated machine that is simple, effective, and not likely to get out of order, to provide means for adjusting said machine to produce blocks of various dimensions, and to provide the same with certain new and useful features, hereinafter more fully described, and particularly pointed out in the claims.

My device consists, essentially, of the combination and arrangement of adjustable sides of the mold, supports adjustable on the sides to hold the ends of the mold, a yoke having attached a screw and a follower to press the contents of the mold and adapted to be moved away from above the mold, means for holding the yoke, means for moving the same, and means for adjusting the sides of the mold, as will more fully appear by reference to the accompanying drawings, in which—

Figure 1:
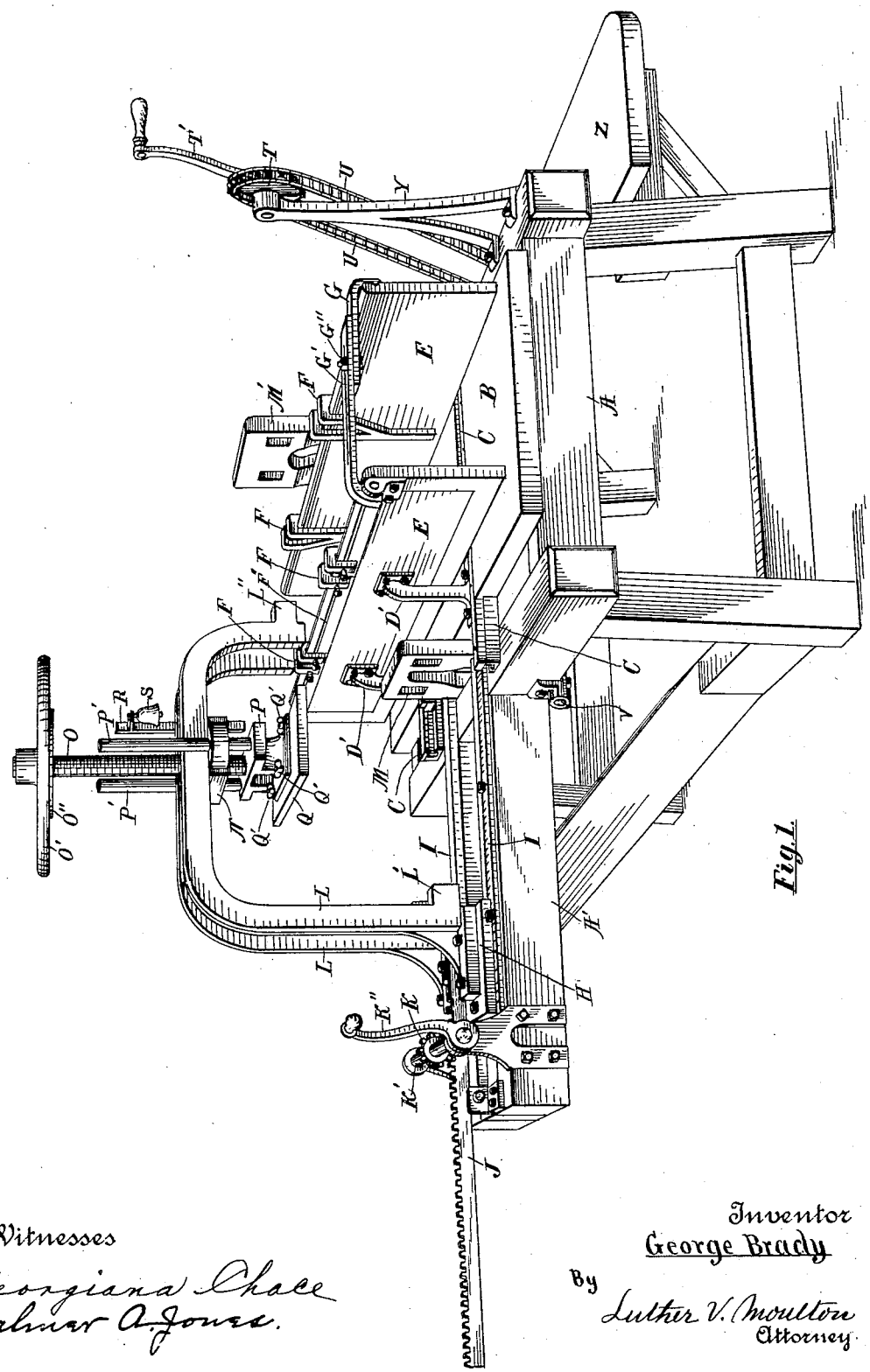
Figure 2:
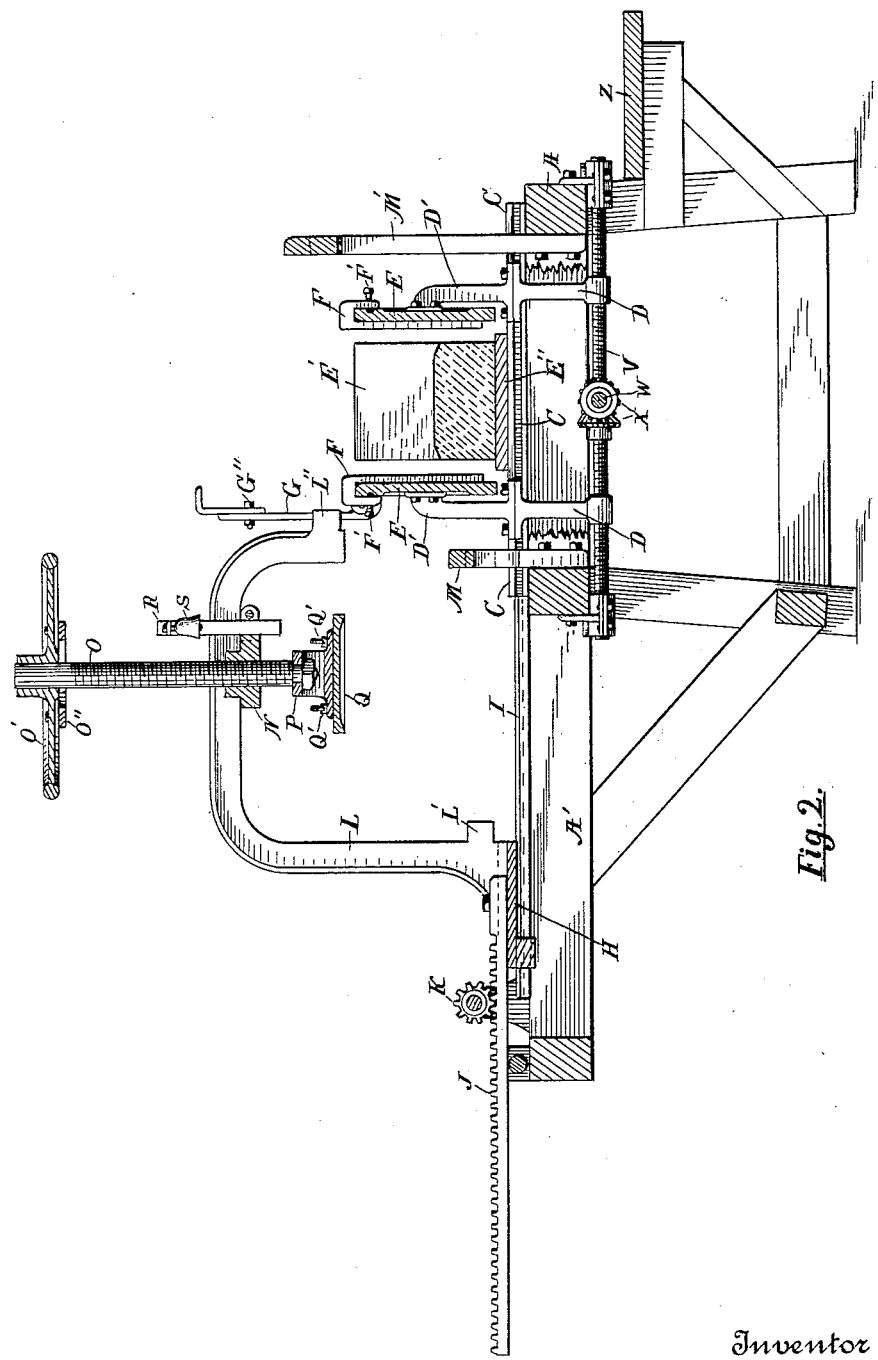
Figure 3:
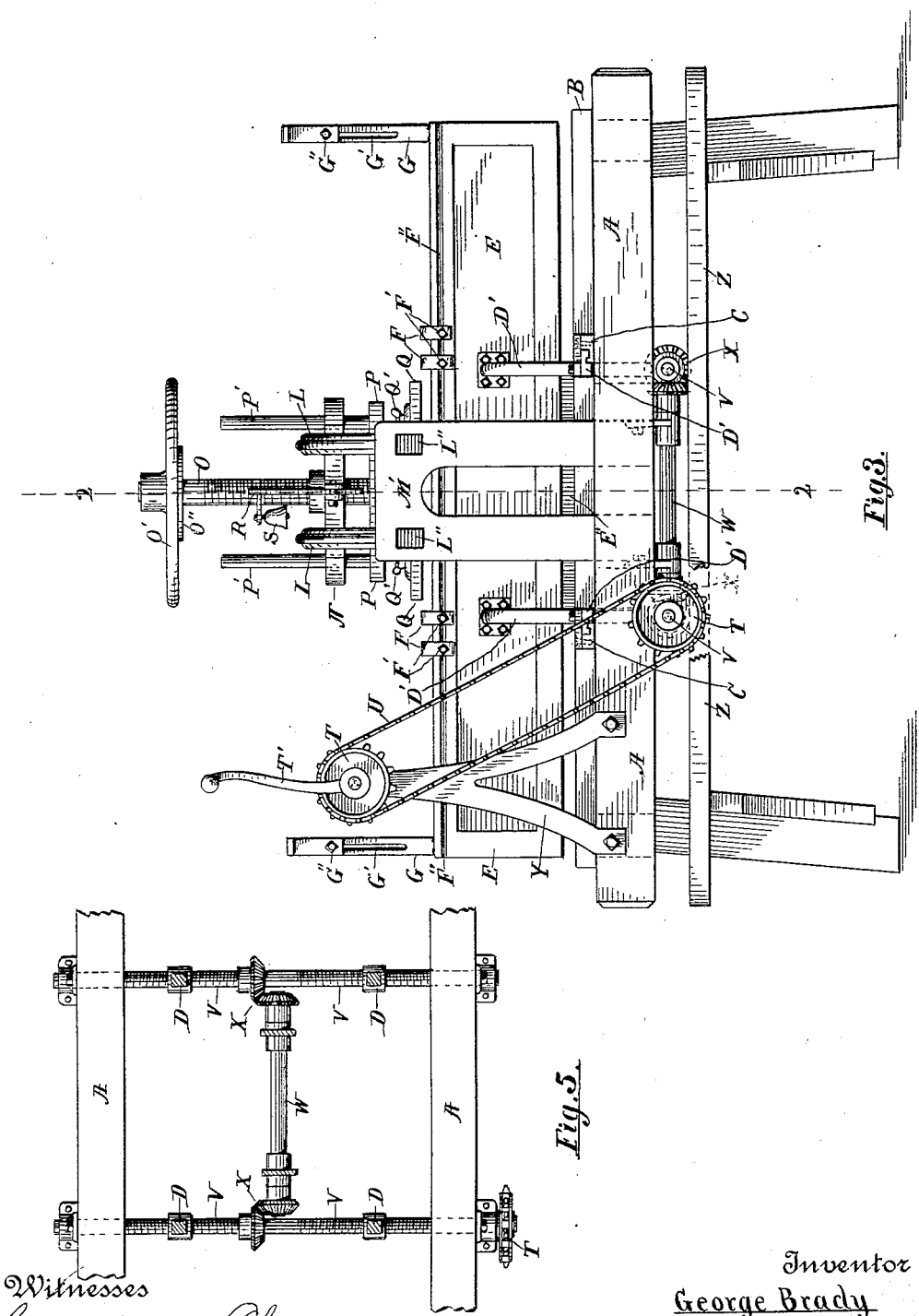
Figure 4:
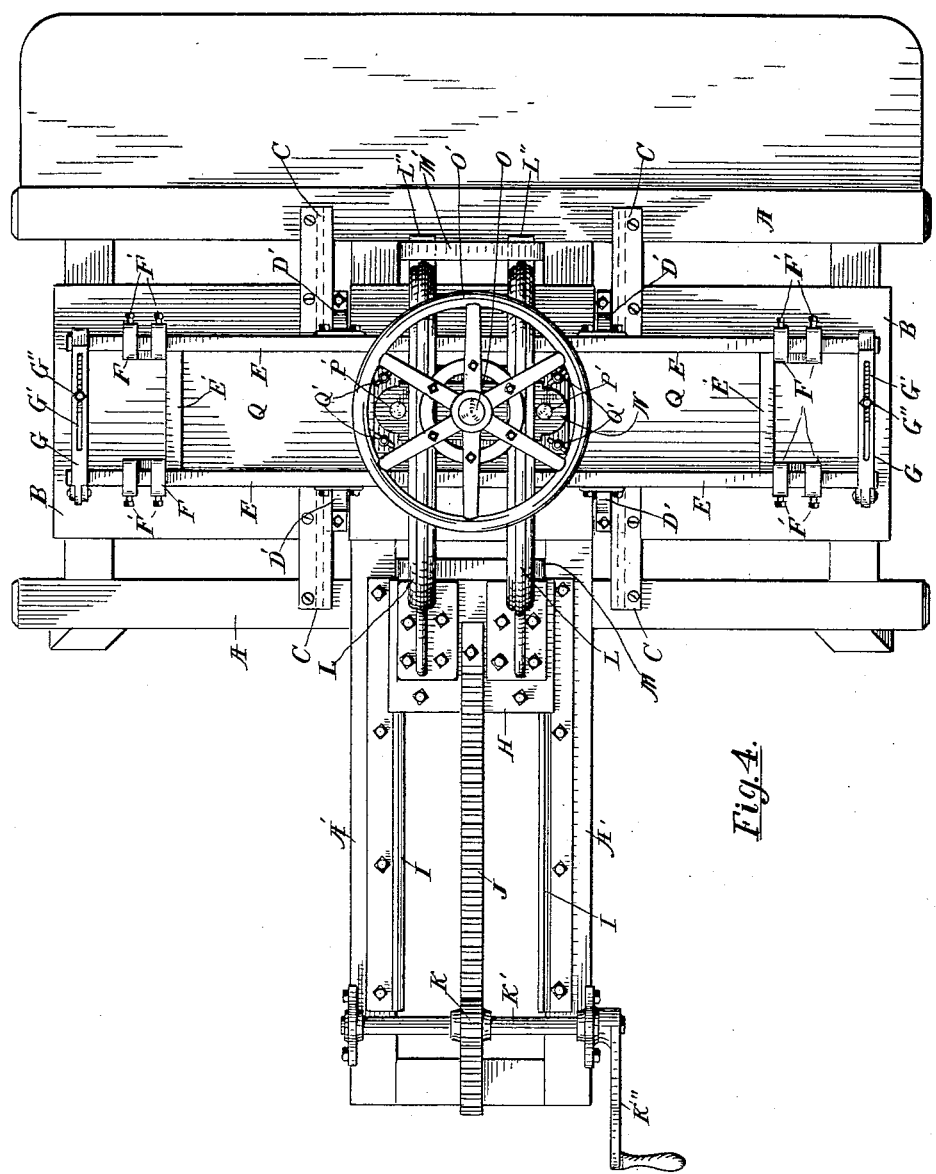

Figure 1 is a perspective of a device embodying my invention; Fig. 2, a vertical section of the same on the line 2 2 of Fig. 3; Fig. 3, a front elevation of the same; Fig. 4, a plan view of the same, and Fig. 5 a detail of the means for adjusting the sides of the mold.

Like letters refer to like parts in all of the figures.

A represents any suitable frame, on which is supported any suitable bed-plate B.

C represents transverse ways, in which are slides D, to which are secured upwardly-projecting posts D', to which posts are attached the sides E of the mold. Extending vertically on the inner surfaces of the sides E and thence over the top and upon the outside of the sides and also longitudinally adjustable thereon are clamps F, which are secured in place by means of suitable set-screws F', engaging grooves F'' in the outer surface of the sides. These clamps serve to support the detached end pieces E' of the molds, which end pieces are of different dimensions to correspond to the different widths of blocks to be formed. To prevent the spreading of the outer ends of the sides E, a clamp C is provided at each end, which clamp is preferably pivoted to the mold at one end and adjustable for length by being made in two overlapping parts and provided with a slot G' and a bolt G'', adjustable in the slot.

A lateral extension A' of the frame is provided on which is mounted a carriage H, adapted to traverse ways I on the said extension and moved by means of a rack-bar J, attached to the carriage at one end, and engaged by a pinion K, mounted on a suitable shaft K', journaled in bearings on the extension A', and provided with a crank K'' to rotate the shaft and pinion. Mounted on this carriage is a double yoke L, extending upward and thence horizontally toward the mold and thence downward to a plane above the plane of the mold, and provided at each end with suitable lugs L' and L'' to engage openings in the upwardly-projecting hangers M and M' at each side of the mold. When this yoke is run over the mold, these lugs enter the openings in the hangers. Attached to the yoke is a block N, so located as to be over the center of the mold when the yoke is run over the same, said block having a central screw-threaded opening in which is mounted a vertical screw O. On the lower end of the screw is a head P, to which head is detachably secured a follower Q by means of thumb-bolts Q'. Said follower is adapted to enter the mold and press the material therein and can be changed as occasion requires, and is also provided on its under surface with such formation as is necessary to suitably impress the surface of the material with the appearance of cut stone, rough ashler, brickwork, or other design, as occasion may require.

To guide the head P, upwardly-projecting rods P' are attached thereto and slidably engage openings in the respective ends of the block N. The screw O is operated by a handwheel O', and on this wheel is a ring O", adapted to engage a vertically-adjustable and flexible support R, to which support is attached a bell S. Thus when the screw is turned down a predetermined distance this ring vibrates the support and rings the bell.

To simultaneously adjust the sides E toward and from each other, the slides D project downward alongside the ways C and are provided with screw-threaded openings in which are inserted transverse right and left threaded screws V, as shown in Fig. 5, and said screws are connected by bevel-gears X and a counter-shaft W to cause them to rotate simultaneously and are operated by means of a sprocket-wheel T on one of said screws, connected by a chain U to a similar wheel T, journaled in suitable upwardly-projecting hangers Y and provided with a crank T'. When the screws V are thus rotated, the slides at each side will simultaneously move toward and from the center line of the mold, and thus move the sides toward and from each other in parallel position.

The device may also be provided with a suitable raised platform Z, upon which the operator can stand to fill the mold and operate the screw O and crank T', the crank K" being operated by an assistant standing on the floor.

The machine is operated as follows: By turning the crank T' the sides are brought in contact with the ends of the end plates E' and with their lower edges just above a suitable pallet-board E''', laid upon the bed-plate B. The material is now placed in the mold and the yoke moved to place over the same with its lugs engaged with the hangers, whereby the yoke is firmly held in place against the strain of the screw O. Said screw is now turned down until the alarm-bell is sounded. The contents of the mold are thus effectively compressed and made of the required dimensions. The screw is then run up until the follower Q is above the top of the mold and the yoke run back from above the mold. The sides E are then separated a sufficient distance to free the ends E' and to permit of the removal of the pallet-board, together with the block thereon, whereupon the described operation may be repeated.

Having thus fully described my invention, what I claim, and desire to secure by Letters Patent, is—

1. The combination of a bed-plate, sides movable toward and from each other, detached ends, adjustable clamps on the sides to support the ends, and means for moving and holding the sides.

2. The combination of a mold having separate sides and ends, means for adjusting and supporting the sides and ends, a yoke movable relative to the mold, a screw mounted on the yoke and a follower attached to the screw.

3. The combination of a bed-plate, transverse ways, slides movable in the ways, sides supported by the slides, detached ends, means for supporting the ends, and means for adjusting the slides in the ways.

4. The combination of a bed-plate, transverse ways, slides movable in the ways, right and left screws engaging the slides, means for simultaneously rotating the screws, sides supported by the slides, adjustable clamps on the sides to support the ends, and detached ends supported by the clamps.

5. The combination of a mold having movable sides and ends, a bed-plate beneath the mold, a yoke, a movable carriage supporting the yoke, means for moving the carriage, a screw mounted on the yoke, and a follower on the screw.

6. The combination of a mold, a carriage movable toward and from the mold, hangers at each side of the mold and provided with openings, a yoke mounted on the carriage and having lugs to engage the openings in the hangers, a screw mounted on the yoke, and a follower on the screw.

7. The combination of a bed-plate, transverse ways, slides movable in the ways, screws to operate the slides, posts attached to the slides, sides supported by the posts, clamps adjustable on the sides, detached ends supported by the clamps, a counter-shaft and bevel-gears connecting the screws, and means for rotating the screws.

8. The combination of a bed-plate, transverse ways, slides movable in the ways, means for adjusting the slides, sides supported on the slides, clamps adjustable on the sides, ends supported by the clamps, hangers at the respective sides of the mold and having openings, a yoke provided with lugs to engage the openings, a screw mounted on the yoke, a follower mounted on the screw, a carriage supporting the yoke, ways traversed by the carriage, and a rack and pinion to move the carriage.

9. The combination of a mold, a screw and follower to compress the contents of the mold, an adjustable and flexible support, a bell mounted upon the support, and a ring mounted on the screw to engage the support and ring the bell.

10. The combination of a bed-plate, sides having grooves in their outer surfaces, means for movably supporting said sides in parallel planes, clamps extending vertically on the inner surfaces of the sides, and thence above and on the outside of the same, set-screws in the clamps, and detached end plates supported by the clamps.

In testimony whereof I affix my signature in presence of two witnesses.

GEORGE BRADY.

Witnesses:
JOHN MCDEVITT,
CHAS. E. BRADY.